United States Patent [19]

Wallace

[11] Patent Number: 4,851,175
[45] Date of Patent: Jul. 25, 1989

[54] METHOD FOR MAKING O-RINGS

[75] Inventor: John S. Wallace, Birmingham, Mich.

[73] Assignee: The Oakland Corporation, Troy, Mich.

[21] Appl. No.: 90,972

[22] Filed: Aug. 31, 1987

[51] Int. Cl.⁴ .............................................. B29C 41/02
[52] U.S. Cl. .................................. 264/255; 264/297.6; 264/310; 264/DIG. 67; 425/DIG. 42
[58] Field of Search ...................... 264/297.6, 304, 310, 264/312, DIG. 67, 255; 425/DIG. 42, 403, 471

[56] References Cited

U.S. PATENT DOCUMENTS 2,638,632  5/1953  Glazer .......................... 264/297.6 X
3,449,484  6/1969  Medley .......................... 264/312 X
4,308,225  12/1981  Magarian ....................... 264/257 X

FOREIGN PATENT DOCUMENTS 60-107310  6/1985  Japan ................................. 264/310

Primary Examiner—Jan H. Silbaugh
Assistant Examiner—Reiley M. Sidwell
Attorney, Agent, or Firm—Barnes, Kisselle, Raisch, Choate, Whittemore & Hulbert

[57] ABSTRACT

A method of making O-rings by depositing a filament of a liquid hot-melt material onto a rotating spindle, or directly upon the shank of a rotating fastener.

15 Claims, 2 Drawing Sheets

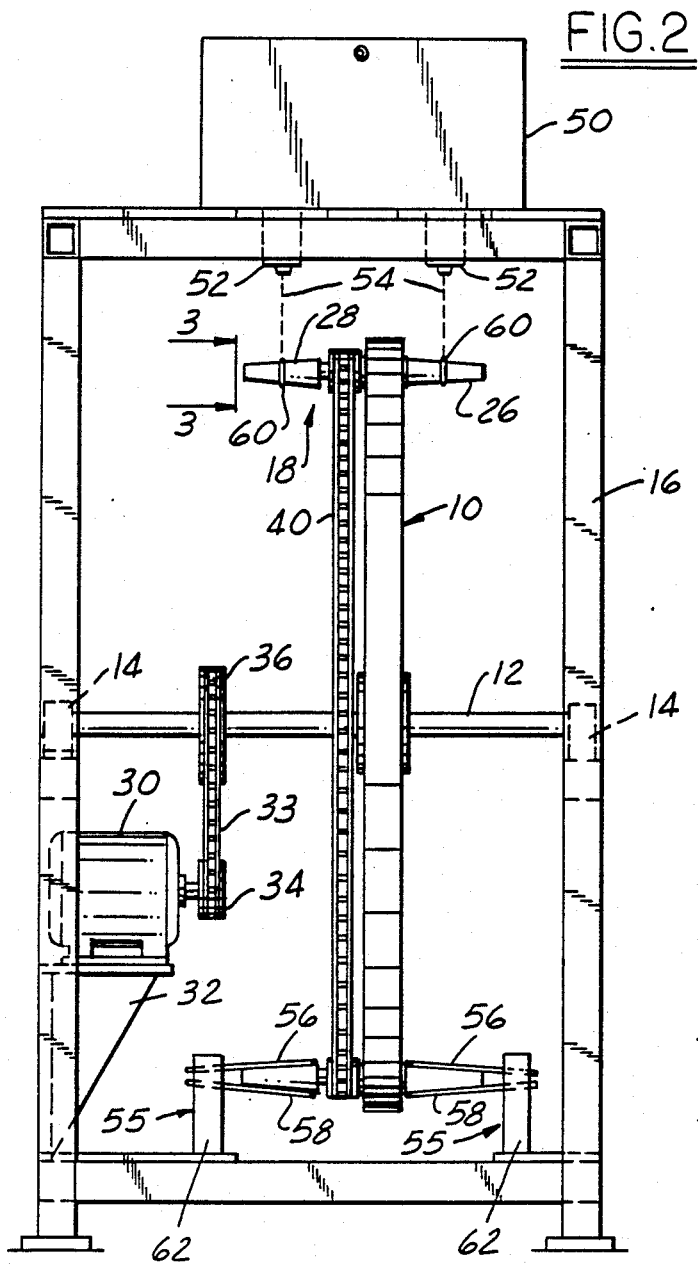
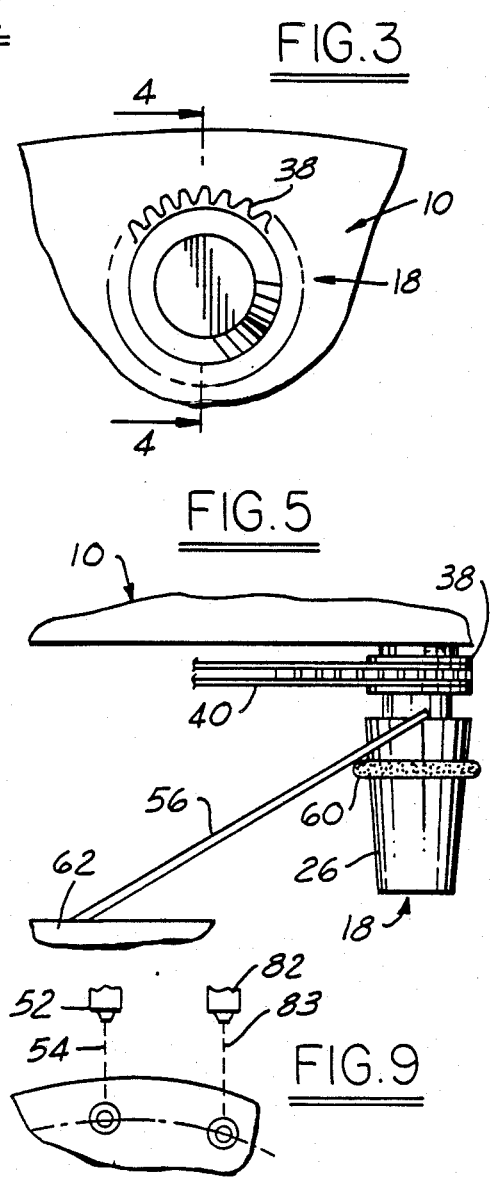
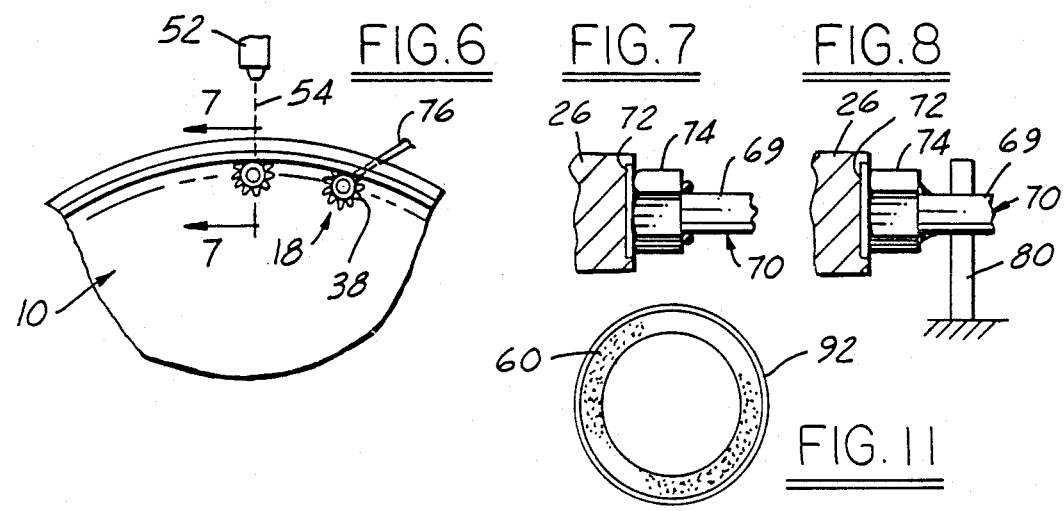

METHOD FOR MAKING O-RINGS

This invention relates generally to O-rings and refers more particularly to a method for making O-rings.

SUMMARY OF THE INVENTION

The O-ring made by the method of this invention is a ring of hot-melt material formed on a rotating spindle and then stripped free to become a discrete ring that has an essentially circular cross-section. It can be made in a variety of different inside diameters, and can be slipped on a typical bolt, screw or rivet and used to seal a head against gases or liquids of all sorts when the fastener is fully seated or clinched.

The O-ring may also be made directly upon the shank of a rotating fastener, either to a smooth or threaded portion thereof. The rotating fastener could be of any regular or irregular cross-section.

I have found amorphous polypropylene to be highly suited as a hot-melt material for use in this invention. It is flowable under pressure and ideal for filling and sealing irregular or over-sized holes in companion sheet metal pieces. It has no elastic qualities and, therefore, an O-ring of this material is used once but normally cannot be reused. It has physical characteristics similar to ordinary wax. It is tough, yet deformable, it has no "cure" feature or requirement. It is available in several grades from softer to harder, and is undissolvable in all common fuels, including keytones, alcohols, oils (natural and synthetic) and dilute acids. Such materials are heat flowable. When cooled to room temperature they show almost no deposit-to-deposit tack, making them ideal for bulk handling of the O-rings or of parts to which the O-rings are applied.

Numerous fillers can be added to the hot-melt material. Particulates ranging from powdered nylon, glass, silica, clay and graphite can be added for various effects. Sealing adjacent metal surfaces in the presence of high temperatures and pressures is greatly enhanced when particles are present.

An alternative material that performs in generally the same way is the family of polyamides in the hot-melt range. Rings made of this material show improved temperature and chemical resistance over polypropylene.

In the case of preformed rings, one, two or more could be used on a bolt to achieve a seal, depending upon conditions and surface irregularities.

In the case of O-rings formed in place directly upon a fastener, they could be positioned anywhere from the shank end to immediately under the head, as required. Headless parts or extended lengths could have rings where needed. Multiple rings at selected positions would also be possible.

The method involves essentially to rotate a piece, for example, a spindle or fastener, under a falling filament of hot, liquid amorphous polypropylene. This filament is best kept to a cross-section substantially smaller than the cross-section of the finished ring to be formed. By using more than one or a multiple of turns, a more uniform section of O-ring can be achieved.

Occasionally it is desired to provide a cover on the outer diameter of the O-ring which is tougher and more resistant to extrusion so that when the fastener is tightened and the O-ring compressed under the head of the fastener against a supporting surface, the O-ring will not at first be squeezed out but will be forced initially toward center and before it succumbs to the seating pressure. A tough cover can be applied to the O-ring during its manufacture by a second falling filament of a somewhat harder hot, liquid material, so that the tough cover is applied immediately after formation of the basic O-ring.

These and other objects of the invention will become more apparent as the following description proceeds, especially when considered with the accompanying drawings.

BRIEF DESCRIPTION OF THE DRAWINGS

FIG. 2 is an end elevational view of the apparatus shown in FIG. 1.

FIG. 3 is a view taken on the line 3—3 in FIG. 2.

FIG. 5 is a view taken on the line 5—5 in FIG. 1.

FIG. 6 is a fragmentary side elevational view of an apparatus of modified construction.

FIG. 7 is a sectional view taken on the line 7—7 in FIG. 6.

FIG. 8 is similar to FIG. 7, but shows the part after it has reached the bottom of the wheel.

FIG. 9 is a view similar to FIG. 6, but shows a further modification.

FIG. 11 is an elevational view of an O-ring formed by the apparatus of FIG. 9.

DETAILED DESCRIPTION

Figure 1:
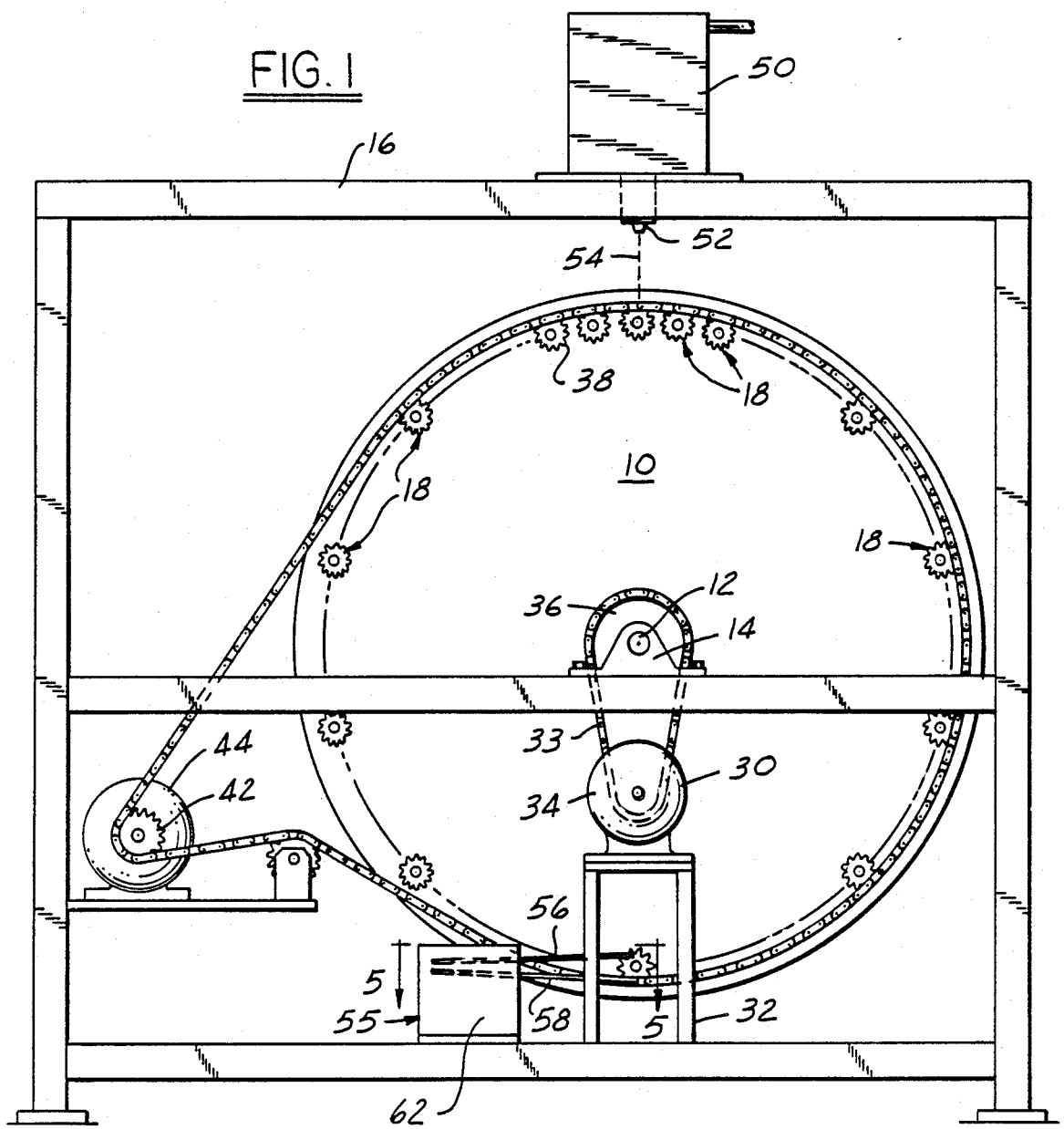
FIG. 1 is a side elevational view of apparatus for use on the practice of the method of this invention.
Figure 4:
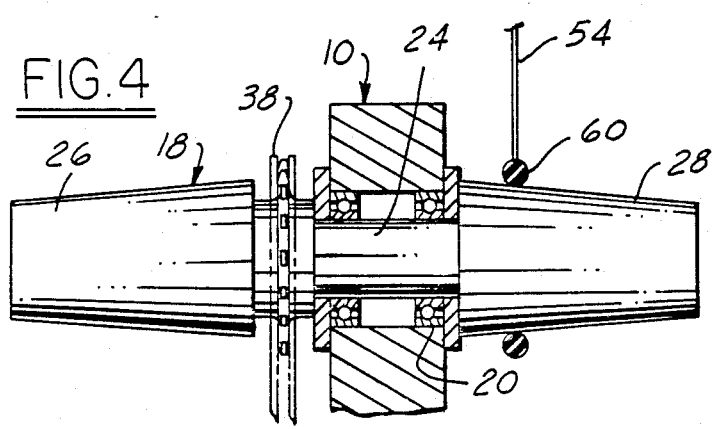
FIG. 4 is a sectional view taken on the line 4—4 in FIG. 3.
Figure 10:
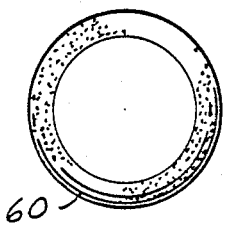
FIG. 10 is an elevational view of an O-ring formed by the apparatus of FIGS. 1-8.

Referring now more particularly to the drawings and especially to FIGS. 1 to 5 thereof, the apparatus there illustrated comprises a wheel 10 in the form of a circular disk which is mounted for rotation in a vertical plane about its central axis on a horizontal shaft 12 to which it is affixed. Shaft 12 is rotatably mounted in bearing blocks 14 on frame 16.

The wheel has a plurality of spindles 18 near its outer edge. The spindles are arranged in equally spaced relation in a circle concentric with the axis of rotation of the wheel. Bearings 20 support each spindle for axial rotation. The spindles extend at right angles to the plane of the wheel and are therefore horizontal.

Each spindle has a reduced central portion 24 in an opening in the wheel, and spindle portions 26 and 28 on each end projecting outwardly from opposite sides of the wheel. These spindle portions are tapered in an outward direction away from the wheel, as shown.

A variable speed motor 30 mounted on a stand 32 drives the wheel by means of a chain 33 extending around a sprocket 34 on the output shaft of the motor and also around a sprocket 36 on the shaft 12.

Each spindle has a sprocket 38 on a reduced part of one of its spindle portions. An endless chain 40 extends around the wheel 10 in engagement with sprockets 38 and is driven by a sprocket 42 on the output shaft of a variable speed motor 44 carried by the frame 16. Only one or two of the sprockets 38 nearest the motor 44 are out of contact with the chain 40, the remaining sprockets being in contact with and rotated by the chain.

A pot 50 is mounted on the frame 16 above the wheel. The pot 50 has a pair of spaced nozzles 52 positioned over the paths of the spindle portions on each side of the wheel. The pot 50 contains a supply of heated, liquid hot-melt material. The nozzle outlets are dimensioned to emit the hot-melt material in a very fine, continuous stream or filament 54. Suitable shutoff means, not shown, are provided to close one or both of the nozzles, as desired. In FIG. 2, both nozzles are open and there can be seen filaments of hot-melt material falling or dripping onto the spindle portions on both sides of the wheel. The build up of hot-melt material on the rotating spindle portions produces O-rings 60.

The nozzles 52 are mounted on the frame 16 in adjusted positions laterally of the wheel 10 so that the falling hot-melt material may contact the spindle portions at any selected point between their large and small ends, depending on the diameter of O-ring desired.

At the bottom of the wheel 10, on one side thereof, a stripper 55 comprising a pair of rods 56 and 58 is supported on a stand 62. The rods are at the angles shown in FIGS. 2 and 5 and extend across the paths of the spindle portions to strip O-rings formed on the spindle portions as they pass. A similar stripper 55 is provided for the same purpose on the opposite side of the wheel 10.

The hot-melt material may be liquid amorphous polypropylene having the characteristics noted above, and may, if desired, contain any of the fillers already identified. It is heated to 250°-350° F. Other materials having similar characteristics may also be employed. As previously stated, the hot-melt material may be selected from the family of polyamides which have better temperature and chemical resistance than polypropylene.

In operation, the wheel 10 is turned by motor 30 clockwise in FIG. 1 and at the same time motor 44 rotates the spindles 18 in one direction or the other. At least one of the nozzles 52 is open to drip a continuous filament of the heated, liquid, hot-melt material onto the tapered portions of the rotating spindles as they pass under the nozzle outlet. The filament wraps around each spindle portion. As a particular spindle moves out of range, the next one catches the filament and the portion between spindles breaks away. The speed of rotation of the spindles 18 and of the wheel 10 preferably is such that the filament of hot-melt material is deposited on each spindle portion during one or more revolutions thereof. Stated another way, the filament preferably takes one or more wraps around each spindle portion as it passes beneath an outlet. The more turns or wraps of filament around each spindle portion, the larger the size of the O-ring cross-section. However, whatever the size, the cross-section is almost perfectly, or at least essentially, circular. By employing an extremely small filament and building up the O-ring cross-section by means of multiple turns, a more uniform cross section can be achieved at any given point around the circumference of the O-ring.

A filament wrapped around a given spindle at the top of the wheel cools rapidly as the spindle moves toward the bottom. By the time it reaches the stripper, it is a discrete O-ring which has solidified enough that it can be stripped from the spindle. The wheel speed may be varied as desired to provide sufficient cooling time, but for a wheel diameter (hence spindle circle diameter) of 4 feet the speed may, for example, be one revolution per minute. Speeds may vary depending on individual preferences and specific formulations of the hot-melt material.

If both nozzles are open, O-rings may be made on the spindle portions at both sides of the wheel simultaneously.

FIGS. 6–8 show a modification in which the O-rings are made directly upon the shanks 69 of bolts 70. The spindle portions are modified to have magnets 72 set in recesses in their outer ends to which the heads 74 of the bolts are magnetically attached. Loading of bolts onto the spindle portions can be accomplished at the point where the chain 40 is out of contact with the spindles (See FIG. 1). The nozzles are adjusted outwardly to positions such that the falling filament deposit of hot-melt material wraps around the shanks of the bolts near the heads. A flame jets from a nozzle 76 spaced from the falling filament in the direction of wheel rotation to soften the deposit on each spindle portion to cause it to flow into a more conforming state as required (flatter, wider band, etc.). When the O-ring deposit is close to the bolt head as shown, the heat of the flame will cause the deposit to run to the angle between the shank and head and create a nearly perfect fillet (FIG. 8). The flame may be omitted, if desired.

A bar 80 at the bottom of the wheel replaces the stripper and knocks off or separates the bolts with deposited O-ring material from the spindles.

FIG. 9 shows a modification in which a second nozzle 82 on each side of the wheel, and spaced from the first nozzles 52 in the direction of wheel rotation, is provided to emit a second filament 83 of liquid hot-melt material onto the O-ring material deposited by the nozzle 52. The hot-melt material from nozzle 82 is heated to the same temperature as that from nozzle 52 and may also be amorphous polypropylene. However, it might be tougher or harder, to provide a cover 92 for the O-ring which is more resistant to extrusion. Such an O-ring, shown at 60 in FIG. 11, when applied to a headed fastener, is more resistant to extrusion when compressed between the fastener head and a supporting surface to which the fastener is applied. The modification of FIG. 9 may be employed to form covered O-rings on the spindles as in FIGS. 1–5, or to form them directly upon the shanks of fasteners.

The spindles may be of uniform diameter rather than tapered. Also, multiple ring formations may be made along the length of each spindle by employing additional nozzles, thereby improving the economic benefits of the method.

The spindles can be hex, square, oval or other irregular shape, depending on the O-ring shape desired.

I claim:

1. A method of making O-rings, comprising providing a spindle, supporting said spindle in a generally horizontal position, axially rotating said spindle, and supplying a continuous stream of liquid hot-melt material onto the rotating spindle from an outlet above said rotating spindle during at least one full revolution thereof to cause said hot-melt material to wrap around said spindle and cool and solidify to form an O-ring thereon.

2. A method of making O-rings, comprising providing a plurality of spindles, generally horizontally supporting said spindles in spaced apart relation, axially rotating said spindles, supplying a continuous stream of liquid hot-melt material from an outlet above said spindles, and relatively moving said outlet and said rotating spindles to cause said stream of hot-melt material to be deposited on said rotating spindles in sequence and during at least one full revolution of each to wrap around said spindles and cool and solidify in the form of O-rings of substantially uniform cross-section throughout their circumference.

3. A method as defined in claim 2, wherein said hot-melt material is amorphous polypropylene.

4. A method as defined in claim 2, wherein said hot-melt material is a polyamide.

5. A method of making O-rings, comprising providing a wheel, supporting said wheel on a generally horizontal axis, axially rotating said wheel, providing a plurality of spindles, supporting said spindles generally horizontally and in spaced apart relation on said wheel in a circle concentric with the axis of rotation of said wheel, axially rotating said spindles, and supplying a continuous stream of a liquid hot-melt material from an outlet above said rotating spindles to cause said stream of hot-melt material to be deposited on said spindles in sequence and during at least one full revolution of each to wrap around said spindles and cool and solidify in the form of O-rings of substantially uniform cross-section throughout their circumference which can be axially stripped from said spindles.

6. A method as defined in claim 5, wherein said hot-melt material is amorphous polypropylene.

7. A method defined in claim 6, wherein said continuous filament of hot-melt material is supplied at a temperature of about 250°–350° F.

8. A method as defined in claim 5, wherein said hot-melt material is a polyamide.

9. A method as defined in claim 5, including stripping said O-rings from said spindles.

10. A method as defined in claim 9, wherein said spindles are tapered to facilitate stripping.

11. A method as defined in claim 1, including stripping said O-ring from said spindle.

12. A method as defined in claim 1, wherein the O-ring thus formed is substantially circular in cross-section.

13. A method as defined in claim 5, wherein the O-rings thus formed are substantially circular in cross-section.

14. A method of making O-rings, comprising providing a spindle, supporting said spindle in a generally horizontal position, axially rotating said spindle, and supplying a continuous stream of liquid hot-melt material onto the rotating spindle from an outlet above said rotating spindle during at least one full revolution thereof to cause said hot-melt material to wrap around said spindle and cool and solidify in the form of a single, continuous, discrete O-ring of uniform circular cross-section throughout its circumference.

15. A method as defined in any one of claims 1–14, including supplying a second continuous stream of liquid hot-melt material onto said or each O-ring in sequence and while it rotates, to form a cover of hot-melt material thereon.

* * * * *